United States Patent [19]

Brill et al.

[11] Patent Number: 5,578,107

[45] Date of Patent: Nov. 26, 1996

[54] WATER SOLUBLE CAKING INHIBITORS FOR AMMONIUM PHOSPHATES

[75] Inventors: Robert V. Brill, St. Louis; Louis A. Highfill, Washington, both of Mo.

[73] Assignee: Monsanto Company, St. Louis, Mo.

[21] Appl. No.: 468,697

[22] Filed: Jun. 6, 1995

[51] Int. Cl.⁶ ........................................ C05B 7/00
[52] U.S. Cl. .................... 71/34; 71/63; 71/64.12; 423/267; 423/310; 423/312
[58] Field of Search ................................... 71/34, 36, 47, 71/53, 63, 64.12; 423/267, 310, 312; 252/135

[56] References Cited

U.S. PATENT DOCUMENTS

| | | | |
|---|---|---|---|
| 2,770,548 | 11/1956 | Hall et al. | 426/652 |
| 3,354,092 | 11/1967 | Perry | 252/523 |
| 5,286,272 | 2/1994 | Biamonte et al. | 71/29 |

*Primary Examiner*—Ferris Lander
*Attorney, Agent, or Firm*—Raymond C. Loyer; Gordon F. Sieckmann

[57] ABSTRACT

There is disclosed a caking inhibitor for mono-and diammonium phosphates which is water soluble and effective at small concentrations rendering the phosphates acceptable in most utilities without separation of the inhibitor. The inhibitor is sodium sulfate. Effective amounts of this salt range from about 0.5 percent to about 1 percent by weight in the ammonium phosphates. It is particularly advantageous that this salt is useful in both types of ammonium phosphates.

8 Claims, No Drawings

WATER SOLUBLE CAKING INHIBITORS FOR AMMONIUM PHOSPHATES

BACKGROUND OF THE INVENTION

Ammonium phosphates have many utilities in industry including such technical uses as fertilizers fire proofing textiles, paper, wood, and vegetable fibers, impregnating lamp wicks, flux for soldering tin, copper, brass and zinc, hard surface cleaners, corrosion inhibitors and in forest fire retardants. They are also useful in food and dentifrice applications such as in purifying sugar, in yeast cultures, oral compositions, baking powder and yeast cultures.

Monoammonium phosphate and diammonium phosphate (hereinafter referred to as ammonium phosphates) prepared from pure acids ($P_2O_5$/water derived from phosphorus burners) rather than from the wet acid process are particularly known for their tendency to cake severely and much effort is used to break up the cake upon delivery of the product. As can be seen from the above noted industrial uses, large amounts of monoammonium and diammonium phosphates are used and therefore shipping containers of large scale size are employed in the transport of these material. Caking is a particular disadvantage when there is presented the occasion of large amounts of these phosphates to cake into shapes of considerable size requiring so much effort as to affect the economics of their use.

Agents employed to inhibit caking of many material in the past have relied upon the property or hygroscopicity or the use of hygroscopic agents to at least minimize caking. Such materials included corn sugar or glycerine, sorbital and propylene glycol. These materials are noted in U.S. Pat. No. 2,770,548 to Hall et al. It is also noted in said patent that small or trace amounts of metal ions function as oxidation catalysts in nitrite converting it to the nitrate. The use of polyphosphate, such as sodium polyphosphate, was added to sequester the metal ions. However, as indicated in the above noted patent, the sequestration of the metal ions did not reduce the tendency of the nitrites to cake. The above noted Hall patent teaches that the hygroscopic caking inhibitor for meat-curing compositions is improved with the addition of an alkaline alkali metal orthophosphate such as trisodium or disodium phosphate or the potassium analogs. Such orthophosphates were employed in the range of from 2% to 5% by weight. However the meat treating compositions disclosed by this patent did not contain any ammonium phosphates.

Various phosphate salts are well know for their utility in detergents. A composition containing monoammonium or diammonium phosphate as a cleaning agent is disclosed in U.S. Pat. No. 3,354,092 to Perry wherein orthophosphates and tripolyphosphates were included for their detergency effect. No caking inhibition was attributed to these salts and they were employed in amounts to provide active cleaning effect ranging from 15% to 25% of the composition while the ammonium phosphates represented only about 6% to about 12% of the composition.

More recently there has been disclosed a water soluble potassium phosphate caking inhibitor for fertilizer compositions in U.S. Pat. No. 5,286,272 to Biamonte et al. More particularly, tripotassium phosphate, which is highly water soluble and hygroscopic, was employed in as little as 0.25% up to 5%, by weight, in fertilizer compositions containing minor amounts of monoammonium and diammonium phosphates along with major amounts of nitrates such as ammonium and potassium nitrates or urea. It has been found that caking tendency increases as the ammonium moiety of the phosphate increases. In large industrial production of ammonium phosphates it is important that the same caking inhibitor can be employed for either monoammonium phosphate or the more severely affected diammonium phosphate. Water solubility is important for most uses of the ammonium phosphates and the use of insoluble caking inhibitors leave undesirable precipitates. Previously water soluble caking inhibitor of adequate activity to be employed in small amounts were unknown for use in monoammonium and diammonium phosphate compositions. There is a need for highly active water soluble caking inhibitors for use in large quantities of monoammonium and diammonium phosphates thereby improving the economics in the use of these materials.

SUMMARY OF THE INVENTION

In accordance with this invention there is provided monoammonium and diammonium phosphate compositions of reduced caking tendency which comprise said phosphate and a caking inhibiting amount of a water soluble sodium sulfate. The sodium sulfate is employed in amounts within the range of at least about 0.5%, by weight, and typically not more than about 1%, by weight, although higher amounts can be employed in those cases wherein the assay of the product is specified as being somewhat less than 99%, by weight. Typically, monoammonium phosphate and diammonium phosphate are sold in concentrations in excess of 90% by weight.

DETAILED DESCRIPTION OF THE INVENTION

Although the caking inhibitors of this invention may be employed in ammonium phosphates from any source, they are particularly efficacious in ammonium phosphates derived from phosphoric acid prepared from burning phosphorus to provide a $P_2O_5$/water solution. Such ammonium phosphates are particularly prone to cake formation. One of the features of this invention is to provide a single caking inhibitor for both monoammonium phosphate and diammonium phosphate although it has been observed that the ability of some agents to reduce the caking tendency of monoammonium phosphate do not necessarily indicate a similar property in diammonium phosphate.

Sodium sulfate is an inexpensive, highly water soluble material making it ideal as a caking inhibitor in the ammonium phosphates of this invention. The sodium sulfate employed in the process of this invention is anhydrous and in the powder form. Typically, the particle size of the phosphate powders are in the range of from about 50 to about 100 microns and usually about 75 microns (200 mesh).

The powdered anhydrous sodium sulfate is thoroughly mixed with the ammonium phosphates in typical mixing apparatus such as vibrators, mixers, tumbler and the like. It is obviously necessary to achieve uniform admixture since the cake forming inhibitor of this invention is employed in very small amounts.

DESCRIPTION OF THE PREFERRED EMBODIMENTS

EXAMPLE 1

In the following tests 2 kg. samples of monoammonium phosphate and diammonium phosphate were taken from 22.68 kg. or 45. kg. bags of product within one day of manufacture. The sample was then mixed with the caking inhibitor candidate by placing the candidate and the ammonium phosphate into a polyethylene tub. The mixture was then agitated by shaking the tub vigorously. After mixing, the contents of the tub were placed into polyethylene bags which were then closed with plastic ties. The bags were placed on pallets in one and layer stored at ambient plant temperature and humidity for a period of 5 weeks. Duplicate samples were prepared and the test score averaged. After storage, the bags were opened and emptied to determine caking tendency. The caking tendency was rated by a numerical scoring system as follows:

| Score | Condition |
| --- | --- |
| 0 | completely free flowing with no lumps |
| 0.5 | completely free flowing with some soft lumps |
| 1 | completely set and easily broken by hand. |
| 2 | completely set and easily broken with moderate effort |
| 3 | completely set and could just barely be broken by hand |
| 4 | completely set and could only be broken by first dropping from 61 cm., then could be further broken by hand |
| 5 | could not be broken by hand or by dropping |

Intermediate ratings are provided by using fractions.

The data obtained is shown below in Table I wherein test results for both monoammonium phosphate and diammonium phosphate appear. In each sample the amount of sodium sulfate additive is 0.2%, by weight of the phosphate. A rating of 1 or less is desired for practical application in commerce. In Table I, powder and granular sodium sulfate are compared.

TABLE 1

| phosphate | sodium sulfate | caking score |
| --- | --- | --- |
| monoammonium | none | 3.5; 3.5 |
| " | powder | 1.0; 1.0 |
| diammonium | none | 3.5; 3.5 |
| " | powder | 0.0; 0.25 |
| " | granular | 1.75; 1.5 |

The above data indicates that the use of sodium sulfate greatly reduces the caking inhibition of the ammonium phosphates. However, the powder form is seen to be highly useful in preventing the caking tendency of both mono- and diammonium phosphate.

EXAMPLE 2

In the manufacture of mono- and diammonium phosphates the mother liquor from which the phosphates are obtained appear to affect the caking tendencies of the product after drying. In an experiment, samples of pure diammonium phosphate were washed with saturated solutions of monoammonium phosphate and diammonium phosphate wherein the ratio of mono- and diammonium phosphate in the wash was varied. The wet diammonium phosphate was then centrifuged and dried. Various samples were prepared in this manner. It has been shown that this ratio affects the tendency of the diammonium phosphate toward caking. After drying, the diammonium phosphate was thoroughly mixed with either 0.5% or 1%, by weight, anhydrous sodium sulfate powder and stored for 5 weeks in a caking cell at ambient temperature and humidity. At the end of the test the contents of the cell was removed and the caking tendency scored in a range of 0 to 4. A score of 0 was given if the material was free flowing and a score of 4 indicates the material was brick hard. The data obtained appears in Table II below. In all cases sodium sulfate provided a remarkable decrease in the tendency of the diammonium phosphate toward caking.

TABLE II

| Control | 0.5% $Na_2SO_4$ | 1.0% $Na_2SO_4$ |
| --- | --- | --- |
| 2.4 | 0.75 | 1.0 |
| 2.9 | 1.0 | 1.0 |
| 2.0 | 0.5 | 1.0 |
| 1.9 | 0.0 | |
| 1.8 | 0.5 | |

As can be seen from the above data, generally, the caking tendency of diammonium phosphate is greatly reduced by incorporating anhydrous sodium sulfate powder in the composition.

Although the invention has been described in terms of specific embodiments which are set forth in considerable detail, it should be understood that this description is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A composition comprising at least about 90% by weight of a phosphate selected from the group consisting of monoammonium phosphate and diammonium phosphate and a caking inhibiting amount of anhydrous sodium sulfate powder.

2. The composition of claim 1 wherein the phosphate is present in at least about 99%, by weight.

3. The composition of claim 1 wherein the amount of caking inhibiting sulfate is present in the range of from about up to about 1.0%, by weight.

4. The composition of claim 1 wherein the sodium sulfate is present in the range of from about 0.2% to about 0.5%, by weight.

5. A method of inhibiting the caking tendency of a compound selected from the group consisting of monoammonium phosphate and diammonium phosphate which comprises incorporating uniformly in a composition containing at least about 90% of said phosphates a caking inhibiting amount of anhydrous sodium sulfate powder.

6. The method of claim 5 wherein the caking inhibiting amount of sulfate is present in the range of up to about 1%, by weight.

7. The method of claim 5 wherein the sodium sulfate is present in the range of from about 0.2% to about 0.5%, by weight.

8. The composition of claim 5 wherein the phosphate is present in at least about 99%, by weight.

* * * * *